(12) United States Patent
Johnson

(10) Patent No.: US 6,753,470 B1
(45) Date of Patent: Jun. 22, 2004

(54) CONDUIT WALL INTERFACE WITH SEALANT PORT

(76) Inventor: Bobby J. Johnson, 130 Meadowlark Dr., Safety Harbor, FL (US) 34695

( * ) Notice: Subject to any disclaimer, the term of this patent is extended or adjusted under 35 U.S.C. 154(b) by 0 days.

(21) Appl. No.: 10/604,738

(22) Filed: Aug. 13, 2003

(51) Int. Cl.$^7$ ................................................. H02G 3/10
(52) U.S. Cl. .......................... 174/48; 174/49; 174/68.1; 174/68.3; 138/177
(58) Field of Search .............................. 174/48, 49, 50, 174/17 CT, 17 R, 50.5, 57, 53, 58, 65 R, 135, 68.1, 68.3; 220/3.2, 3.3; 248/56, 49; 138/177, 103, DIG. 11

(56) References Cited

U.S. PATENT DOCUMENTS

| | | | |
|---|---|---|---|
| 1,914,011 A | * | 6/1933 | Eccles ......................... 220/3.8 |
| 2,234,640 A | | 3/1941 | Austin, Jr. |
| 2,506,064 A | | 5/1950 | Christie |
| 3,809,798 A | * | 5/1974 | Simon ....................... 174/65 R |
| 3,879,641 A | | 4/1975 | Byrd |
| 3,996,415 A | | 12/1976 | Provorse |
| 4,366,344 A | * | 12/1982 | Sheehan ................... 174/65 R |
| 4,431,198 A | * | 2/1984 | Beinhaur et al. ......... 174/65 R |
| 4,656,313 A | * | 4/1987 | Moore et al. ................. 174/48 |
| 4,688,747 A | * | 8/1987 | Helmsdorfer et al. ......... 174/67 |
| 4,739,596 A | | 4/1988 | Cunningham et al. |
| 4,797,507 A | * | 1/1989 | Lofving ........................ 174/48 |
| 4,861,942 A | | 8/1989 | Moran, Jr. |
| 5,051,747 A | * | 9/1991 | Harshman et al. ........ 174/35 R |
| 5,403,974 A | * | 4/1995 | Leach et al. ................... 174/48 |
| 6,149,107 A | | 11/2000 | Kerr et al. |
| 6,547,589 B2 | | 4/2003 | Magyar et al. |
| 6,580,029 B1 | * | 6/2003 | Bing ............................ 174/48 |
| 2002/0079424 A1 | | 6/2002 | Wells |

* cited by examiner

*Primary Examiner*—Dhiru R Patel
(74) *Attorney, Agent, or Firm*—Ronald E. Smith; Smith & Hopen, P.A.

(57) ABSTRACT

A hollow housing has a closed top, a closed back, a pair of side walls formed integrally with the closed top and the closed back, an open front and an open bottom. The open front is adapted to abuttingly engage a flat exterior surface of a wall of a building. The open bottom receives an uppermost end of a vertically oriented conduit. A throughbore is formed in the wall so that at least one cable enters the vertically oriented conduit from a lowermost end, extends through the lumen of the conduit, makes a gentle right angle bend in the hollow housing, and extends through the throughbore into the interior of the building. Sealant is then introduced into the hollow housing through a port formed in the closed top to seal the throughbore.

6 Claims, 3 Drawing Sheets

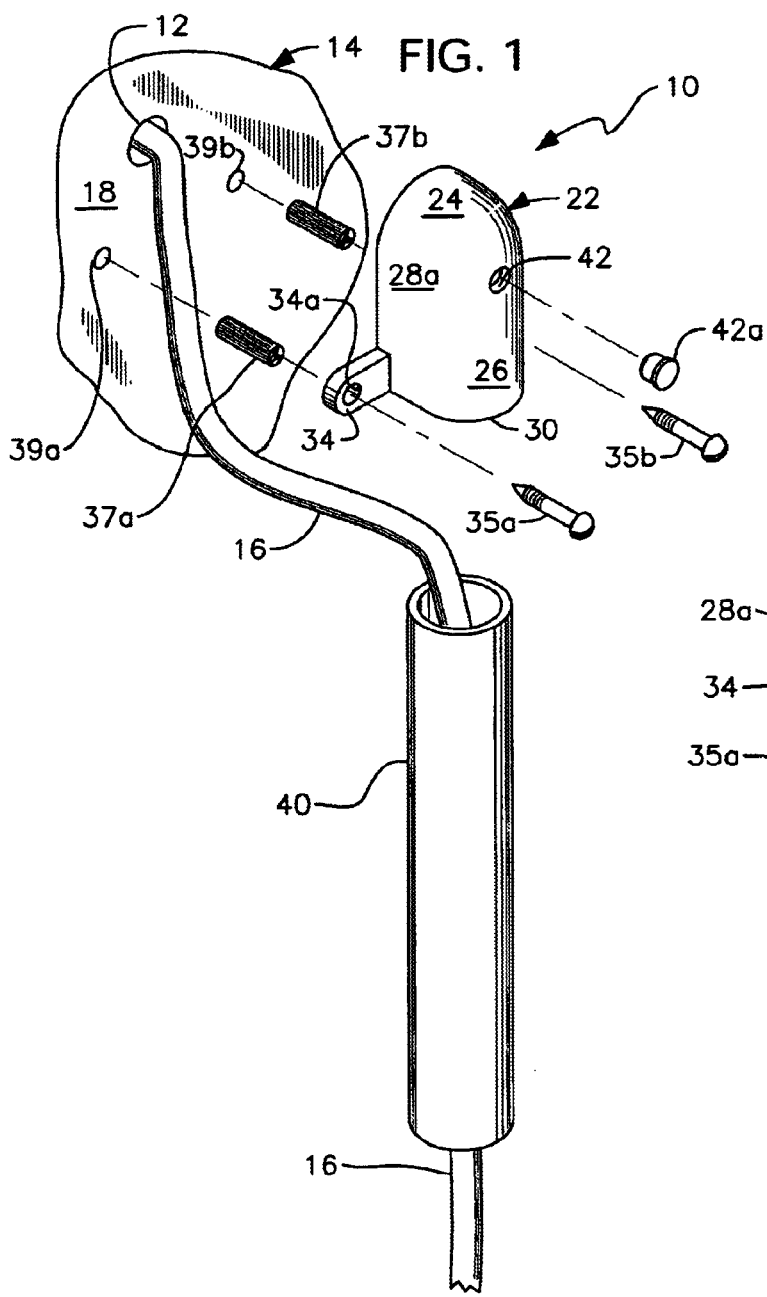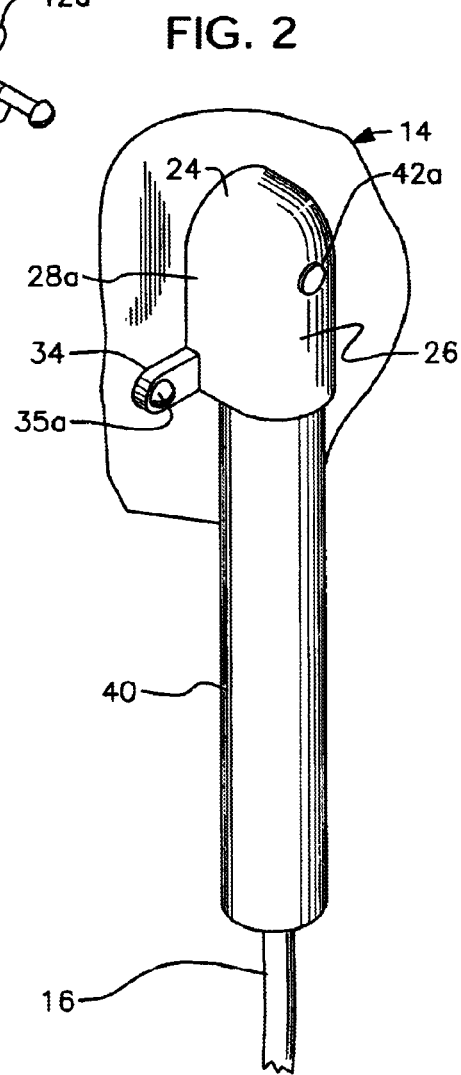

FIG. 3
FIG. 4
FIG. 5
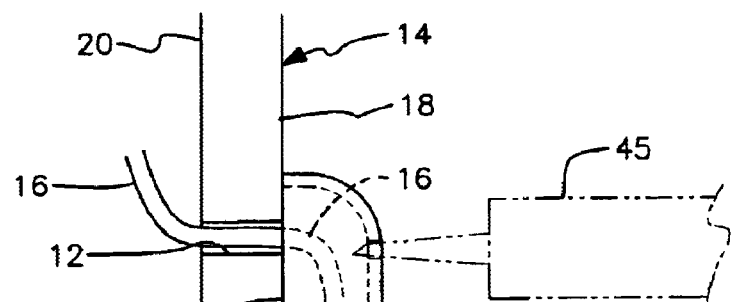
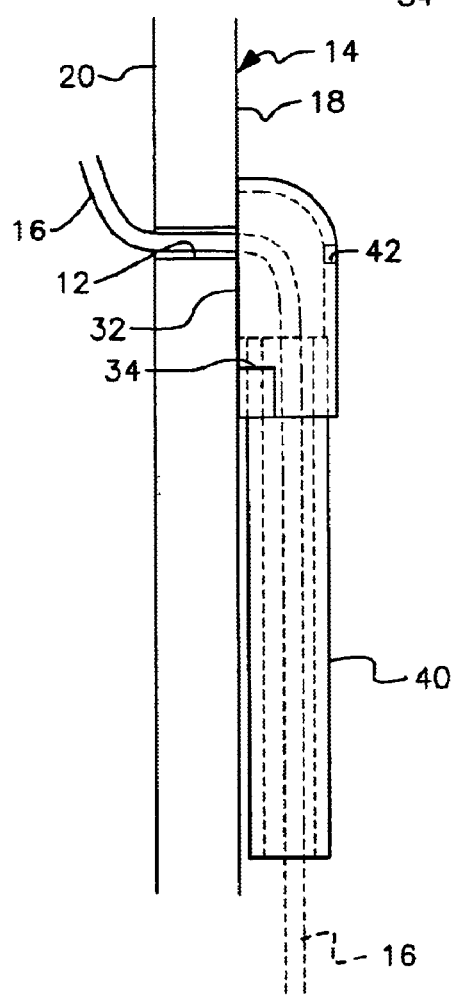
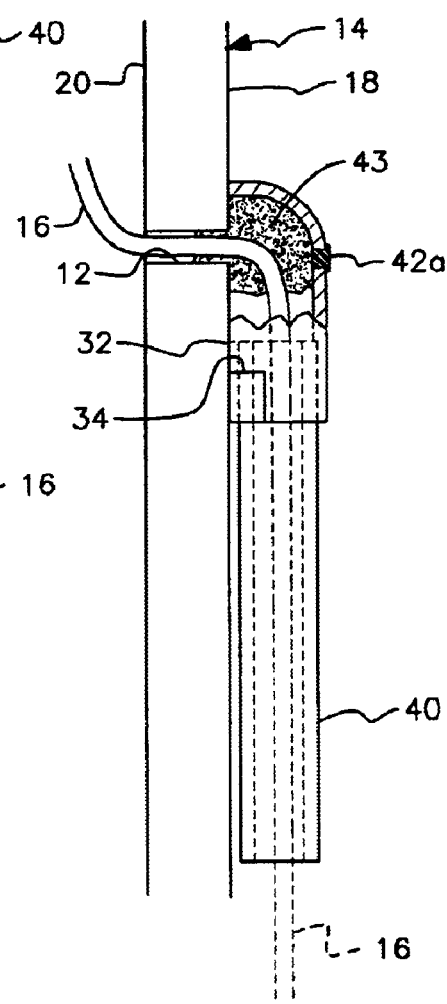

CONDUIT WALL INTERFACE WITH SEALANT PORT

BACKGROUND OF INVENTION

1. Field of the Invention

This invention relates, primarily, to the art of building construction. More generally, it relates to an aesthetic device that covers and seals an opening in an exterior wall through which electrical wiring, tubing, or other elongate members extend.

2. Description of the Prior Art

An opening must be formed in an exterior wall of a house or other building so that external electrical wiring may enter into the interior of such building.

The hole must be sealed around the wiring to form a barrier that keeps out the effects of weather, insects, and the like.

Cable television companies, for example, typically drill a throughbore in an exterior wall, position a centrally-apertured rubber grommet in the throughbore, and extend the cable through the central aperture. The rubber grommet is typically exposed to the effects of sunlight. Thus, it usually disintegrates within a few months. Its disintegration allows insects, reptiles, and the like to travel through the throughbore.

In other applications, an opening may need to be formed in the wall of a planter so that the soil in the planter may be irrigated by drip tubing or the like. It is customary to seal such openings with a grommet, just as in the cable TV example just mentioned.

There are several more elaborate ways of sealing such an opening or throughbore, and some of them have been patented. However, some of the known methods are time-consuming, some of them are expensive, and some of them are ineffective.

U.S. Pat. No. 1,914,011 to Eccles depicts a hollow housing that is screw threadedly engaged to an external wall that covers a throughbore formed in the external wall. The external and internal wiring meets in the housing but the housing is otherwise empty or hollow. Thus, no barrier to insect entry is provided.

U.S. Pat. No. 5,051,747 to Harshman et al. discloses an interface for cables for preventing the escape of electromagnetic radiation. It includes a housing with an attachable cover. The cover is closed during operation, but is removed to enable introduction of powdered graphite into the housing after cable installation. The graphite fills a recess defined by the housing, thereby isolating the cables from the housing and from all other cables.

However, the Harshman et al. structure employs an O-ring to form the seal.

Accordingly, its installation is relatively slow and not inexpensive.

U.S. Pat. No. 6,580,029 to Bing discloses an electrical conduit body that facilitates removal through securable screws. However, Bing does not suggest a means of insulating or protecting the electrical wires.

U.S. Pat. No. 4,656,313 to Moore et al. teaches a cable penetration seal formed by shaped packing blocks of deformable material.

Thus there is a need for an improved structure for sealing an electrical wiring throughbore formed in an exterior wall of a structure that is fast and easy to install, inexpensive, and effective.

A similar need exists for sealing openings formed in other materials for other reasons, such as the sealing of an opening in the wall of a planter around an irrigation drip tube, for example.

However, in view of the prior art considered as a whole at the time the present invention was made, it was not obvious to those of ordinary skill in the pertinent art how the identified needs could be fulfilled.

SUMMARY OF INVENTION

The long-standing but heretofore unfulfilled need for an aesthetic structure that covers and seals a throughbore for electrical wiring, piping, tubes, or other elongate members is now met by a new, useful, and nonobvious invention. The novel device covers a throughbore or opening and is adapted to receive a conduit for electrical wiring, piping, tubing, or the like. The novel structure includes a hollow housing having a closed top, a closed back, a pair of side walls formed integrally with the closed top and the closed back, an open bottom, and an open front adapted to abut against an exterior surface of a wall within which the throughbore is formed.

The device further includes fastening means for securing the hollow housing to the exterior surface of a wall so that the open front of the hollow housing abuts the exterior surface of the wall. The closed top, closed back, and the pair of side walls collectively form a hollow interior when the open front of the hollow housing is disposed in abutting relation to the exterior surface of the wall.

The hollow interior is adapted to accommodate an upper end of the conduit and the conduit has a lumen adapted to accommodate at least one electrical conductor. The upper end of the conduit may be press fit into the hollow housing, secured thereinto by a suitable adhesive, screw-threadedly engaged thereto, or secured by other means.

A port is formed in the closed top and is adapted to receive a sealant that at least partially fills the hollow housing to seal the throughbore. A cap closes the port and is removed from the port when the sealant is introduced into the hollow housing. The cap is placed in closing relation to the port after the sealant has been introduced into the hollow housing.

The fastening means includes a first flange formed integrally with a first side wall and a second flange formed integrally with the second side wall. The first flange is positioned in normal relation to the first side wall and the second flange is positioned in normal relation to the second side wall. Both flanges are disposed in overlying relation to the exterior surface of the wall when the open front of the hollow housing is disposed in abutting relation to the exterior surface of the wall.

An important object of this invention is to provide a throughbore seal that may be installed quickly.

Another object is to provide a throughbore seal that is inexpensive yet effective.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 1 is an exploded perspective view of the novel device;

FIG. 2 is an assembled, perspective view thereof;

FIG. 3 is a side elevational view depicting a typical installation of the novel structure before the sealant has been introduced into the hollow housing;

FIG. 4 is a side elevational view like that of FIG. 3 but adding a diagrammatic view of a caulking gun in phantom lines to indicate how sealant is introduced into the hollow housing;

FIG. 5 is a side elevational, partially cut-away view depicting the sealant in its functional position;

DETAILED DESCRIPTION

Figure 6:
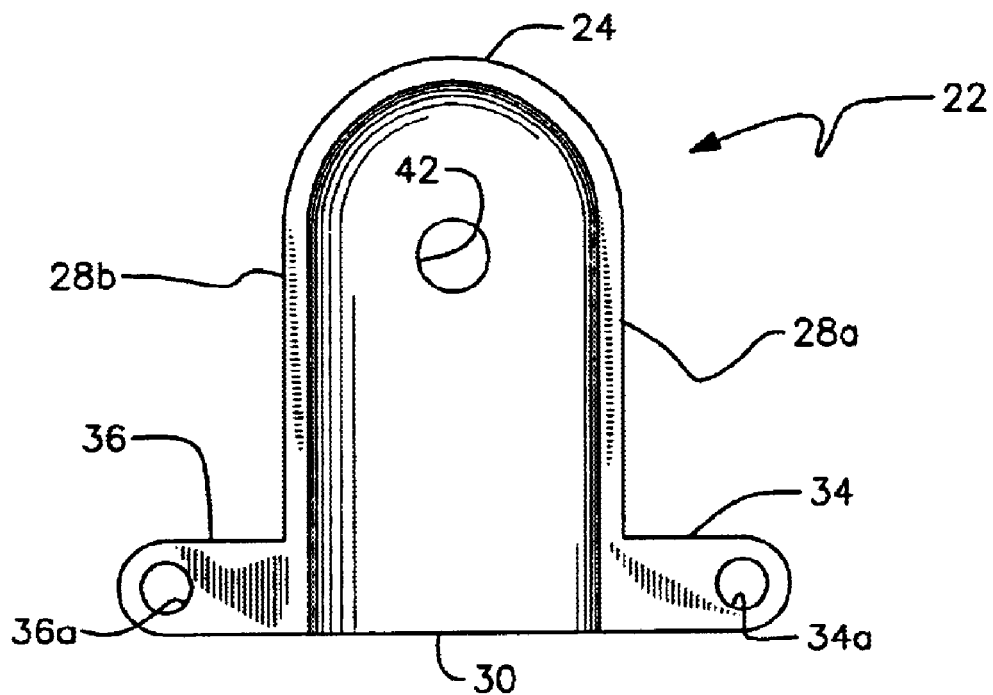
FIG. 6 is a front elevational view of the novel device.

Referring to FIG. 1, it will there be seen that the reference numeral 10 denotes an illustrative embodiment of the present invention as a whole.

An opening or throughbore 12 is formed in a wall 14 of a structure such as a house or building so that electrical wiring 16, which may take the form of a cable, a plurality of cables, or other electrical wiring, may extend from an exterior surface 18 of said wall (see FIGS. 3–5) to an interior surface 20 of said wall.

A similar opening could be formed in a wall of a planter or other container, as mentioned above. In that application, an irrigation drip tube or the like would extend through the opening. The invention is not limited to means for sealing throughbores in external building walls that receive electrical wiring, nor is it limited to means for sealing openings in planters. It applies to numerous other applications where an elongate member is passed through an opening or throughbore formed in a wall, roof, floor, or the like of a structure, container, housing, or the like.

In the exemplary embodiment, device 10 includes a hollow housing 22 that is fixedly secured to exterior side 18 of wall 14. Hollow housing 22 is sized so that it completely covers throughbore 12 formed in wall 14.

Figure 7:
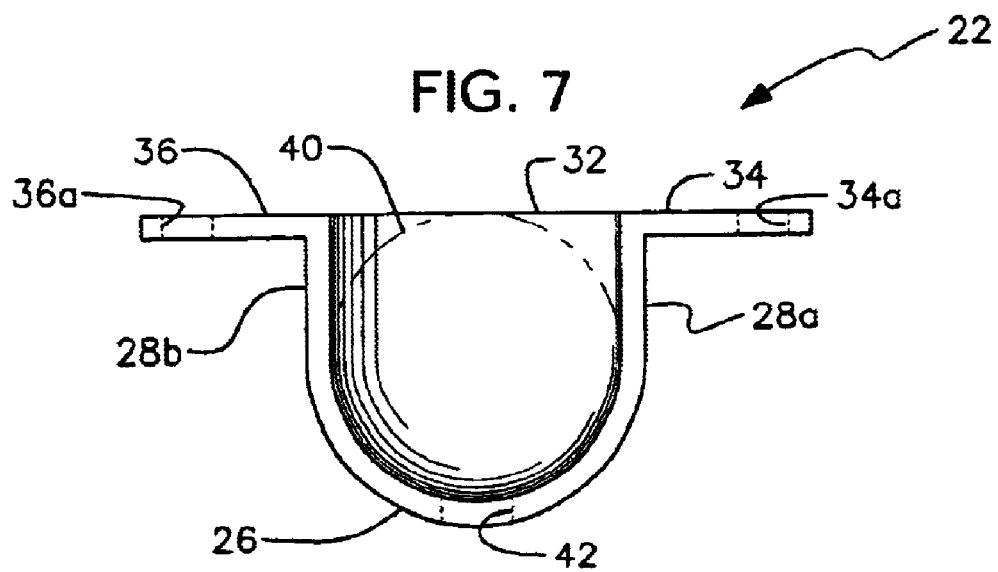
FIG. 7 is an end view thereof.

As perhaps best understood in connection with FIGS. 6 and 7, hollow housing 22 includes a top end 24, a back 26, a pair of side walls 28a, 28b formed integrally with top end 24 and back 26, an open bottom end 30 and an open front 32. A pair of flanges 34, 36 are integrally formed with side walls 28a, 28b, respectively, and extend laterally therefrom in substantially normal relation thereto.

It should be understood that hollow housing 22 may have a transverse cross-section of any predetermined geometrical configuration, including square, rectangular, triangular, circular, oval, elliptical, pentagonal, and the like.

Each flange 34, 36 is centrally apertured as at 34a, 36a to accommodate an associated screw 35a, 35b, that extends therethrough and into wall 14 to secure hollow housing to said wall in overlying relation to said throughbore 12. In FIG. 1, the anchors that hold screws 35a, 35b are denoted 37a, 37b and the anchor-receiving bores formed in wall 14 are denoted 39a, 39b. The use of other fastening means is within the scope of this invention.

Open front 32 of hollow housing 22 is disposed in abutting relation to exterior surface 18 of wall 14 when said screws extend through apertures 34a, 36a and into wall 18.

Top end 24 may have a hemispherical configuration when viewed in front elevation such as depicted in FIG. 6. However, said top end may also be squared off or have any other functional configuration.

Hollow housing 22 may have a "U"-shape when viewed in end view as depicted in FIG. 7. However, said hollow housing could also have a squared or other non-arcuate configuration as mentioned above.

The hollow interior of hollow housing 22 is sized to accommodate conduit 40 which may take the form of a polyvinylchloride (PVC) pipe. Conduit 40 may also be formed of plastic, ABS, or any other suitable material. Conduit 40 is positioned on the exterior side of wall 14 in overlying or closely spaced relation to exterior surface 18. Conduit 40 is typically oriented in an upstanding, vertical orientation for aesthetic purposes. Accordingly, hollow housing 22 is also oriented in a vertical orientation.

The upper end of conduit 40 may be press fit into the open end of hollow housing 22, as depicted, or it may be secured thereto by other means such as a screw-threaded engagement, adhesive engagement, or the like. In a preferred embodiment, as depicted in FIGS. 3–5, the uppermost end of conduit 40 is positioned about a third of the way into hollow housing 22. This provides sufficient clearance to enable cables, tubing, or electrical wiring 16 to make a gentle ninety degree (90°) bend into throughbore 12 after exiting the uppermost end of conduit 40.

Port 42 is formed in hollow housing 22 at a preselected location that is spaced apart from the uppermost end of conduit 40. Removable cap 42a seals said port 42.

A suitable sealant 43 (FIG. 5) is introduced through port 42 into the hollow interior of housing 22 after said housing has been secured to exterior surface 18 of wall 14 and after the uppermost end of conduit 40 has been inserted into said hollow housing in the manner depicted in FIG. 1. As indicated in FIG. 4, a suitable sealant is a caulking compound 43 delivered by a caulk gun 45.

As depicted in FIG. 5, the sealant closes throughbore 12 and fills the upper end of hollow housing 22, i.e., the part of said hollow housing not occupied by conduit 40. The sealant may also flow to some extent into the lumen of conduit 40.

Sealant 43 preferably surrounds the extent of cables, tubing, or wiring 16 in the vicinity of throughbore 12. Further sealant introduction into the lumen of conduit 40 would waste sealant and perform no useful function.

In this way, hot or cold air cannot pass through throughbore 12, nor can moisture, insects, reptiles, or the like. Significantly, the amount of time required to position hollow housing over throughbore 12, insert fastening means 35a, 35b through apertures 34a, 36a formed in flanges 34, 36, insert conduit 40 into open end 30 of hollow housing 22, and fill the hollow housing with sealant 43 takes only a few minutes. This achieves the primary object of the invention.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall between.

What is claimed is:

1. A device that covers a throughbore comprising:

a hollow housing having a closed top, a closed back a pair of side walls formed integrally with said closed top and said closed back, an open bottom, and an open front that abuts against an exterior surface of a wall having said throughbore formed therein;

fastening means for securing said hollow housing to said exterior surface of said wall so that said open front of said hollow housing abuts said exterior surface of said wall;

said closed top, closed back, and said pair of side walls collectively forming a hollow interior when said open front of said hollow housing is disposed in abutting relation to said exterior surface of said wall;

a conduit being disposed in parallel relation to said exterior surface of said wall;

an upper end of said conduit received within said open bottom of said hollow housing;

said conduit having a lumen to accommodate at least one cable;

said at least one cable extending through said lumen, though said hollow housing, and said through said throughbore;

a port formed in said closed back;

a sealant introduced into said hollow housing through said port;

said sealant surrounding said at least one cable within said hollow housing and said sealant at least partially filling said hollow housing and sealing said throughbore.

2. The device of claim 1, further comprising:

a cap for closing said port;

said cap being removed from said port when said sealant is introduced into said hollow housing;

said cap being placed in closing relation to said port after said sealant has been introduced into said hollow housing.

3. The device of claim 1, said fastening means further comprising:

a first flange formed integrally with a first side wall of said pair of side walls;

said first flange positioned in normal relation to a said first side wall of said pair of side walls and in overlying relation to said exterior surface of said wall when said open front of said hollow housing is disposed in abutting relation to said exterior surface of said wall;

a second flange formed integrally with a second side wall of said pair of side walls;

said second flange positioned in normal relation to said second side wall of said pair of side walls and in overlying relation to said exterior surface of said wall when said open front of said hollow housing is disposed in abutting relation to said exterior surface of said wall;

a screw-receiving aperture formed in said first flange; and a screw-receiving aperture formed in said second flange.

4. The device of claim 3, further comprising:

said hollow housing having a "U"-shape when viewed in end view.

5. The device of claim 4, further comprising:

said closed top having a hemispherical appearance when viewed in front elevation.

6. The device of claim 1, further comprising:

said upper end of said conduit being press fit into said open bottom of said hollow housing.

* * * * *